Sept. 29, 1942.  D. ERBEN  2,297,395
RADIO DIRECTION FINDING SYSTEM
Filed Feb. 14, 1940
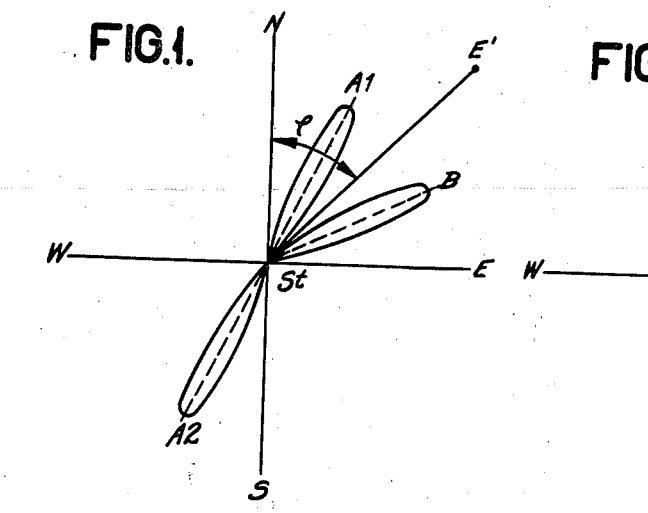
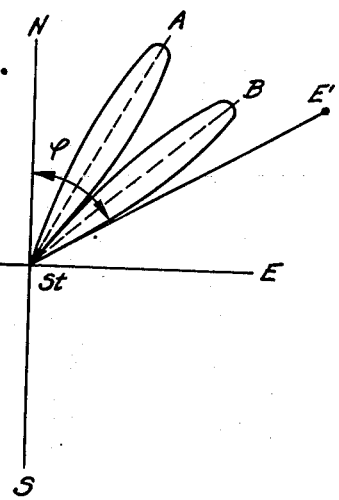
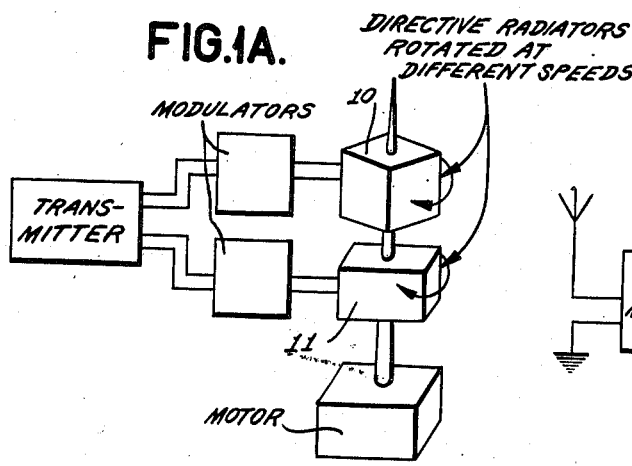
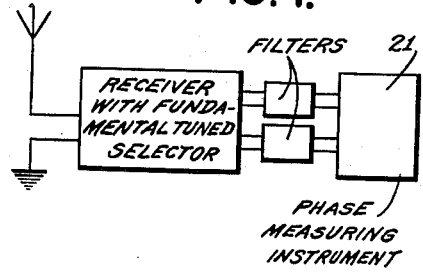
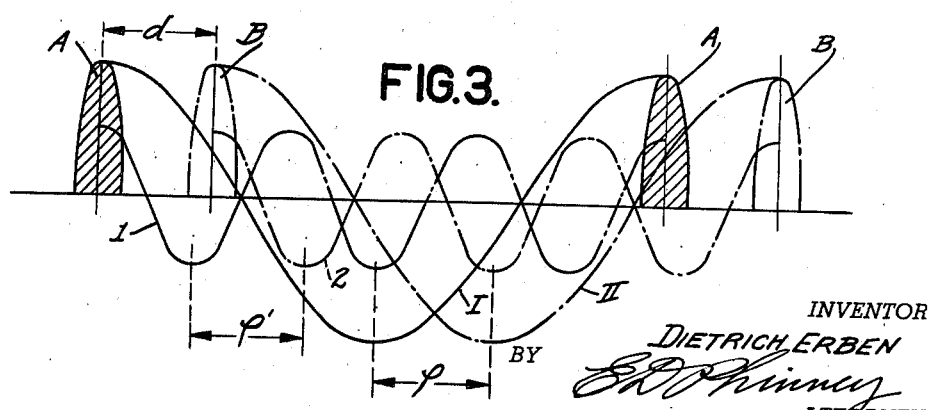
INVENTOR
DIETRICH ERBEN
BY
ATTORNEY Patented Sept. 29, 1942

2,297,395

UNITED STATES PATENT OFFICE 2,297,395

RADIO DIRECTION FINDING SYSTEM

Dietrich Erben, Berlin, Germany; vested in the Alien Property Custodian

Application February 14, 1940, Serial No. 318,808 In Germany May 14, 1936

6 Claims. (Cl. 250—11)

This invention relates to radio findings systems, and more particularly to methods of and means for determining position by means of rotating radio beacons.

A known method of determining positions in aircraft is to emit from a ground transmitter directional radiations comprising two station directional radiations comprising two different signals which are alternately keyed in accordance with any predetermined rhythm, and to rotate the resulting radiation line of equal field intensity along which the signals merge to form a continuous dash. At the moment when the radiation line is oriented toward a given point, such as the geographical north, for instance, a signal is transmitted from the ground station in all directions, means being provided on the radio receiving side for counting the equal signals picked up between the reception of this non-directional signal and the directional continuous dash line for determining the aircraft's position relative to the ground transmitter. In order to increase the accuracy of such position indication, suggestions have been made separately to count the dots and dashes in the receiver and to deduct the arithmetical mean value of such counting so as to eliminate inaccuracies which may be introduced in response to the width of the zone of equal field intensity.

My invention consists in certain features of novelty which will appear from the following description and be pointed out in the appended claims, reference being made to the accompanying drawing, in which Fig. 1 diagrammatically illustrates one method of obtaining bearings according to which my invention may be put in effect, Fig. 1A illustrates a transmission system for producing radiations such as those of Fig. 1, Fig. 2 shows a modification over the embodiment illustrated in Fig. 1, while Fig. 3 diagrammatically shows the manner how the radiations are utilized in the receiving station for position determination and Fig. 4 illustrates a suitable receiving circuit.

It is the main object of this invention to provide new and useful methods of effecting wireless position determination by transmitting from a radio range transmitter a number of sharply directive ultra high frequency radiations and to rotate such radiations in the horizontal plane at different speeds and to cause certain radiations to coincide with each other when oriented toward a predetermined geographical bearing, such as the north direction, for instance. The direction is then determined in response to the time which elapses between the effectiveness of the different patterns in a radio receiving equipment.

According to a further object of this invention, the difference in time between the effectiveness of the various patterns in radio receiving equipment is converted into a phase displacement between the fundamental and/or harmonic frequencies of the signals received for obtaining direct reading indication.

Referring first to Fig. 1 which illustrates the fundamental principle according to my invention, St denotes a radio range station, such as shown in Fig. 1A, having radiators 10, 11 from which are emitted a number of sharply directive high frequency radiation patterns distinguished from one another. Two beams A1 and A2, radiated, for example, from radiator 10, mutually displaced by 180 degrees are rotated in the horizontal plane. A single beam B from radiator 11 is likewise rotated in the horizontal plane but at a speed which differs from that of the double beam A1, A2. It will be assumed that a radio receiver is in position E' and that the angle formed between the line interconnecting the radio range transmitter with the receiver and the north bearing is equal to $\phi$. In the present case it will be assumed that the single beam B rotates at twice the velocity of the double beams A1 and A2. These radiations are picked up in the receiving position E' with a time difference dependent upon the angle N—St—E'. Due to the fact that the different radiations are subjected to a continuous rotation, their effect at the receiving position E' is a periodical procedure so that only the ratio of the time difference to a complete cycle need be measured. The receiving station, by means of any suitable apparatus, for example, that shown in Fig. 4, will pick up the signals in the form of impulses at equal time intervals from the double beam A1, A2 and from the single beam B. The phase displacement between these impulses, or a wave having a frequency determined by said impulses, is then measured a suitable form of indicator 21, at the receiving position as an indication with respect to the relative positions of the receiver and the radio range transmitter. The field intensities of the different radiations are preferably equal in order to eliminate errors. The absolute field intensity may differ but the relative field intensities of the radiations must always present unity value. The indication obtained in the receiver in the embodiment under consideration is ambiguous since the beam B during one complete revolution approaches the beam A2 at the same ratio as it is removed from the beam A1 during the first part of the complete revolution. This ambiguity is due to the fact that the angular determination has to do only with the phase displacement and no discrimination can be made between positive and negative phases.

The accuracy of indication in the radio receiver may be increased by increasing the number of the A-radiations and by correspondingly increasing the number of revolutions of the radiation B. The corresponding increase with respect to the ambiguity of indication may be eliminated by modulating the different radiations with distinguishing frequencies.

A further embodiment according to this invention is shown in Fig. 2 in which two single beams A and B from radiators such as 10, 11 of Fig. 1A, are caused to rotate in the horizontal plane at speeds which differ from one another only by a slight amount, say $$\frac{U}{U+1}$$

when U denotes the number of revolutions per minute. The radiators emitting the various radiations are continuously caused to rotate but the energization of the radiators is interrupted for the faster rotating pattern during U-revolutions and for the slower rotating pattern during U(—1)-revolutions per minute for establishing coincidence between the patterns when oriented toward a given geographical bearing, such as the north point, for instance.

The coincidence between the two radiations in a given geographical direction may also be obtained by arresting the faster rotating radiation pattern during a short instant when oriented toward this geographical direction until the slower rotating radiation pattern coincides therewith, whereupon the same cycle is restarted.

The method of utilizing the different radiations in a radio receiver is shown in Fig. 3. It has already been pointed out that the different radiations are periodically rendered effective in the receiver and that the difference in time between the reception of the one and the other kind of radiations depends upon the momentary angle N—St—E'. The effectiveness of the radiation patterns in a radio receiver is illustrated in Fig. 3 by way of example. The hatched impulses A result, for instance, from the radiation or radiations A while the dash-dotted impulses are set up in response to the receipt of the radiation B. These impulses are received at different times and this time difference is indicated at $d$ which in accordance with a further feature of this invention is to be measured as a phase displacement. These impulses contain a number of harmonic frequencies from which first the fundamental frequency is selected by means of tuning circuits. The fundamental frequency of the impulses A is denoted I while II denotes the fundamental frequency of the impulse B. The fundamental frequencies I and II are of the same frequency and amplitude but they are displaced with respect to one another by a phase angle which corresponds to the time difference $d$. A discrimination between the fundamental frequencies in the receiver is made possible by the modulation of the various radiations by distinguishing frequencies in the radio range transmitter. These frequencies are detected in the receiver and separated in a filter device. The segregated modulation frequencies occurring at the output of the filter are then applied to any phase indicating instrument known in the art. In order to increase the accuracy of indication it is also proposed according to this invention to select harmonics, for instance, the third harmonic shown at 1 and 2 in Fig. 3 and to measure the phase displacement $\phi'$. It is thus possible to gradually increase the accuracy by selecting higher harmonics and by measuring the phase displacement therebetween.

The ambiguity may, for instance, be eliminated by the use of several additional modulation frequencies. A vibrating reed frequency metering device may be used in one of the low frequency stages of the receiver, whereby the possibilities for ambiguous indications will be decisive for the number of vibrating reeds used in such instrument. The responding reed indicates the sector for which the indication of the instrument is used.

The use of sharply directional radiations in the radio range transmitter permits the energy consumption to be considerably decreased. By taking the ambiguity eliminating means into consideration the angular position of the receiver relative to the radio range transmitter may be directly read off from the indicating instrument.

What is claimed is:

1. A system for effecting wireless position determination comprising a radio range transmitter, means at said transmitter for emitting energy in at least two individual lobe-shaped high frequency radiation patterns, means for causing rotation of said radiation patterns substantially in the horizontal plane at different speeds, for causing certain of said patterns to coincide with each other when oriented toward a predetermined geographical bearing, and a radio receiver having means responsive to receipt of said energy for measuring the time difference between the reception of said radiation patterns for ascertaining the instantaneous bearing of the radio receiver relative to the radio range transmitter.

2. The method of effecting wireless position determination which comprises, emitting from a radio range transmitter a number of individual lobe-shaped high frequency radiation patterns, rotating the radiation patterns substantially in the horizontal plane at different speeds, causing certain thereof to coincide with each other when oriented toward a predetermined geographical bearing, modulating the various patterns with different distinguishing frequencies, and measuring in a radio receiver the time difference between the reception of either of the radiation patterns for ascertaining the instantaneous bearing of the radio receiver relative to the radio range transmitter.

3. The method of effecting wireless position determination which comprises, emitting from a radio range transmitter a number of individual lobe-shaped high frequency radiation patterns, rotating one of the patterns in the horizontal plane at a speed according to the formula $n \times U$, in which $n$ denotes an integral numerical factor and $U$ the number of revolutions per minute, orienting $n$ patterns to form an angle of $$\frac{2\pi}{n}$$

with one another, concurrently subjecting the $n$ patterns to a rotational movement in the same horizontal plane at a speed of $U$ revolutions per minute, causing the one pattern to coincide with each of the $n$ patterns when oriented toward a predetermined geographical bearing, modulating the various patterns with different distinguishing frequencies, and measuring in a radio receiver the difference of time between the reception of the first-mentioned pattern and either of the last-mentioned patterns, for ascertaining the instantaneous bearing of the radio receiver relative to the radio range transmitter.

4. The method of effecting wireless position determination which comprises, emitting from a radio range transmitter a number of individual lobe-shaped high frequency radiation patterns, rotating the radiation patterns substantially in the horizontal plane at different speeds, causing certain thereof to coincide with each other when oriented toward a predetermined geographical bearing, modulating the various patterns with different distinguishing frequencies, measuring in a radio receiver the time difference between the reception of any two of the radiation patterns, and converting the time difference into a phase difference for ascertaining the instantaneous bearing of the radio receiver relative to the radio range transmitter.

5. The method of effecting wireless position determination which comprises, emitting from a radio range transmitter a number of individual lobe-shaped high frequency radiation patterns, rotating the radiation patterns in the horizontal plane substantially at different speeds, causing certain thereof to coincide with each other when oriented toward a predetermined geographical bearing, modulating the various patterns with different distinguishing frequencies, selecting in a radio receiver the fundamental frequency of the high frequency patterns, segregating these frequencies in accordance with the distinguishing modulation frequencies and measuring the phase displacement between the resulting oscillations.

6. The method of effecting wireless position determination which comprises, emitting from a radio range transmitter a number of individual lobe-shaped high frequency radiation patterns, rotating the radiation patterns in the horizontal plane substantially at different speeds, causing certain thereof to coincide with each other when oriented toward a predetermined geographical bearing, modulating the various patterns with different distinguishing frequencies, selecting in a radio receiver a suitable harmonic of the high frequency patterns, segregating these frequencies in accordance with the distinguishing modulation frequencies and measuring the phase displacement between the resulting oscillations.

DIETRICH ERBEN.